United States Patent
De Pasquale et al.

(10) Patent No.: US 9,106,278 B2
(45) Date of Patent: Aug. 11, 2015

(54) DATA TRANSMISSION IN A WIDE AREA MOBILE NETWORK

(75) Inventors: Andrea De Pasquale, Madrid (ES); Kyriakos Exadaktylos, Madrid (ES); Esperanza Alcazar Viguera, Madrid (ES); Maria Diaz Mateos, Madrid (ES); Beatriz Garriga Muñiz, Madrid (ES); Francisco Javier Dominguez Romero, Madrid (ES); Brendan McWilliams, Madrid (ES); Julio Urbano Ruiz, Madrid (ES); Clara Serrano Solsona, Madrid (ES); Javier López Roman, Madrid (ES); Aitor García Viñas, Madrid (ES); Santiago Tenorio Sanz, Madrid (ES); Yannick Le Pezennec, Madrid (ES)

(73) Assignee: VODAFONE GROUP PLC, Newbury, Berkshire (GB)

( * ) Notice: Subject to any disclaimer, the term of this patent is extended or adjusted under 35 U.S.C. 154(b) by 330 days.

(21) Appl. No.: 12/844,243

(22) Filed: Jul. 27, 2010

(65) Prior Publication Data

US 2011/0080970 A1    Apr. 7, 2011

(30) Foreign Application Priority Data

Jul. 27, 2009  (ES) ................... 200930515

(51) Int. Cl.
*H04B 7/02* (2006.01)
*H04B 7/04* (2006.01)
*H04B 7/06* (2006.01)
*H04B 7/10* (2006.01)

(52) U.S. Cl.
CPC ............ *H04B 7/0413* (2013.01); *H04B 7/0689* (2013.01); *H04B 7/10* (2013.01)

(58) Field of Classification Search
CPC ........ H01Q 21/24; H04B 7/10; H04B 7/0413; H04B 7/0689
USPC ................ 375/260, 267, 295, 299; 455/562.1
See application file for complete search history.

(56) References Cited

U.S. PATENT DOCUMENTS

| 6,201,801 B1* | 3/2001 | Dent ............................. 370/342 |
| 6,380,896 B1 | 4/2002 | Berger et al. |
| 2002/0085643 A1* | 7/2002 | Kitchener et al. ............ 375/267 |

(Continued)

FOREIGN PATENT DOCUMENTS

| EP | 2 031 768 | 3/2006 |
| WO | WO 2006/071153 | * 7/2006 ............... H01Q 1/24 |

OTHER PUBLICATIONS

3GPP TR 25.876 V.7.0.0, Mar. 2007, pp. 57-58.*

(Continued)

*Primary Examiner* — Sophia Vlahos
(74) *Attorney, Agent, or Firm* — B. Aaron Schulman, Esq.; Nicholas Trenkle; Stites & Harbison, PLLC.

(57) ABSTRACT

A method for data transmission in a wide area mobile network supporting both MIMO User Equipments and non MIMO User Equipments includes allocating in a first signal the traffic of non MIMO user Equipments, a first MIMO data stream and a primary pilot channel, allocating in a second signal a second MIMO data stream and a secondary pilot channel, and transmitting the first signal and the second signal with two orthogonal circular polarizations.

6 Claims, 2 Drawing Sheets

(56) References Cited

U.S. PATENT DOCUMENTS

| | | |
|---|---|---|
| 2003/0012318 A1* | 1/2003 | Piirainen .................. 375/358 |
| 2006/0002347 A1* | 1/2006 | Thompson et al. ........... 370/335 |
| 2006/0199577 A1 | 9/2006 | Ramakrishna et al. |
| 2007/0274253 A1* | 11/2007 | Zhang et al. ................. 370/328 |
| 2008/0219375 A1* | 9/2008 | Yun et al. ..................... 375/267 |
| 2010/0061344 A1* | 3/2010 | Goransson et al. ........... 370/335 |
| 2010/0202431 A1 | 8/2010 | Kazmi et al. |
| 2012/0108186 A1* | 5/2012 | Goransson et al. ........... 455/101 |

OTHER PUBLICATIONS

Spanish Search Report for Application No. 200930515 dated Jul. 27, 2009.

European Search Report dated May 5, 2014 in corresponding European Patent Application No. 10 17 0869.

* cited by examiner

DATA TRANSMISSION IN A WIDE AREA MOBILE NETWORK

FIELD OF THE INVENTION

The present invention has its application within the telecommunications sector and, especially, in the industrial area engaged in providing Radio Access Networks (RANs) with elements of cellular infrastructures such as Radio Network Controllers (RNCs) and Base Stations (Nodes B) for wireless communications systems.

More specifically, it relates to wireless communications systems supporting both MIMO and non MIMO variants of HSDPA technologies.

BACKGROUND OF THE INVENTION

Related Art

HSDPA (High Speed Downlink Packet Access) is a packet-based data service in the 3rd generation W-CDMA (Wideband Code Division Multiple Access) systems, which provides high-speed data transmission (with different download rates according to the HSDPA technology step e.g. 7.2/10.8/16.2/21.6/28.8 Mbps over a 5 MHz bandwidth) to support multimedia services.

In order to reach the higher peak rates (28.8 Mbps with 3GPP Release), the MIMO (Multiple Input Multiple Output) feature is used in HSDPA, in which multiple antennas are implemented at both base station (Node B) and mobile terminals (UE: User Equipment).

The basic MIMO feature as standardised in 3GPP Release 7 is based on two transmitter antennas (at the node B) and two receiving antennas (at the UE) using a common carrier. At the transmitter, the transmitted data is divided into 2 data streams and transmitted through the two antennas using the same radio resource (same time i.e. Transmission Time Interval and HSDPA codes). The two streams of data are recovered by the UE from the signals received via its 2 antennas (Rx Diversity). Thus, the MIMO feature needs support in MIMO-enabled terminals as well as in the network. In order to deploy MIMO and transmit two parallel data streams, two power amplifiers are required per sector (one for each of the two antennas). In order to not use an entire carrier for MIMO only (5 Mhz), it is more efficient and practical to use the same carrier as non MIMO devices e.g. HSDPA legacy terminals to utilise all available capacity.

MIMO technology is an important step in the evolution of HSDPA, as it provides higher data rates in downlink whilst further improving spectrum efficiency.

However, there is an important drawback as a consequence of transmitting two independent MIMO data streams through two independent channels (e.g. by using two orthogonal linear polarizations). A non MIMO user equipment equalizes the channel by listening to a pilot signal transmitted together with its data, however unless some special measure is applied, the device is only able to equalize one of the channels (the one over which its data is being transmitted), the second MIMO stream and the second pilot channel becoming both a harmful interference as its effect is not equalized since it is transmitted through a independent channel.

There are some potential solutions based in Transmit diversity that can reduce the effect of this interference such as STTD (Space Time Transmit Diversity) or CLTD (Closed-Loop Transmit Diversity) in HSDPA. However they are not only generally complex from a system perspective, as they imply serious constraints for upcoming features such as Dual Carrier, but what is worse, in the specific case of HSDPA none of them fully resolves the issue due to the observed lack of support in legacy terminals (i.e. non MIMO user equipments). This follows a well known compromise design taken by WCDMA chipset manufacturers for Advanced Receivers (those using an Equaliser), according to which the equalizer is turned off whenever transmit diversity is used in the system. This results in an unacceptable performance degradation of the service for users with non MIMO terminals. Field trials carried out in the field by mobile network operators have shown that the STTD activation significantly decreases the performance of some categories of HSDPA terminals already in the market (i.e. those with Advanced Receivers) when the terminals are operating in both good and medium radio conditions. Performances in good radio conditions are precisely those that permit reaching the highest peak rates offered by the mobile network operators.

Thus, there is a need of a solution that allows the implantation of MIMO systems in a network with coexisting non MIMO terminals, without worsening the service received by this legacy terminals.

SUMMARY OF THE INVENTION

The current invention solves the aforementioned problems by disclosing a system and method that allows non MIMO User Equipments to perform a correct equalization thanks to the use of two orthogonal circular polarizations for the two MIMO data streams.

In a first aspect of the present invention, a method for transmitting data in a wide area mobile network with coexisting MIMO User Equipments and non MIMO User Equipments is disclosed. The network provides at least one radio carrier for traffic allocation, the at least one radio carrier carrying a first signal and a second signal to being able to support MIMO traffic, which comprises a first MIMO data stream associated to a primary pilot channel (e.g. Common Pilot Channel, CPICH, in 3G) and a second MIMO data stream associated to a secondary pilot channel.

The disclosed method comprises:
  Allocating in the first signal the traffic of non MIMO user Equipments (e.g. non MIMO HSDPA, Release 99, CCH), the first MIMO data stream and the primary pilot channel.
  Allocating in the second signal the second MIMO data stream and the secondary pilot channel.
  transmitting the first signal using a first circular polarization (Left Handed Circular LHC or Right Handed Circular RHC);
  transmitting the second signal using a second circular polarization which is orthogonal to the first circular polarization (Right Handed Circular RHC or Left Handed Circular LHC).

In this way, both signals undergo the same modifications due to diffraction and reflection when received by a non-MIMO terminal, allowing correct equalization of the channel, while for MIMO terminals the signals maintain their independence by using orthogonal polarizations, thus being able to guarantee that, for MIMO terminals, the performance of the network is at least maintained by using the present invention.

Preferably, the aforementioned circular polarizations are achieved by forming two combined signals, each of which contains both original signals (i.e. the first and second signals), one of which has its phase shifted 90°; and then transmitting the combined signals with two orthogonal linear polarizations, thus resulting in the transmission of the original signals with circular polarization.

In another aspect of the present invention, a system is disclosed that implements the described method by comprising:

Allocation means configured to allocate in the first signal the traffic of non MIMO user Equipments, the first MIMO data stream and the primary pilot channel; and in the second the second MIMO data stream and the secondary pilot channel.

Transmission means configured to transmit each signal with a different circular polarization, being these polarizations orthogonal to preserve the independence of the channels.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
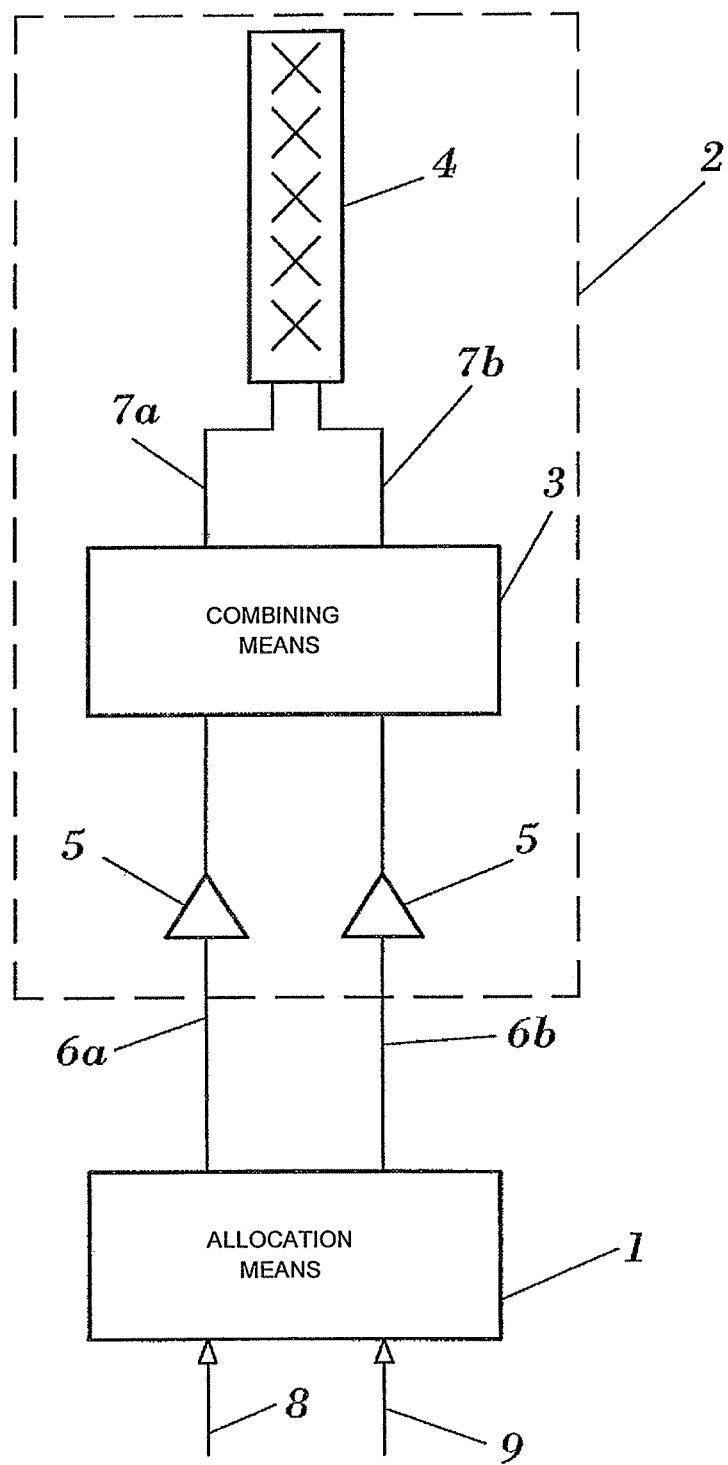
FIG. 1 shows a diagram of a first preferred embodiment of the method of the invention, which uses a 90° hybrid combiner.
Figure 2:
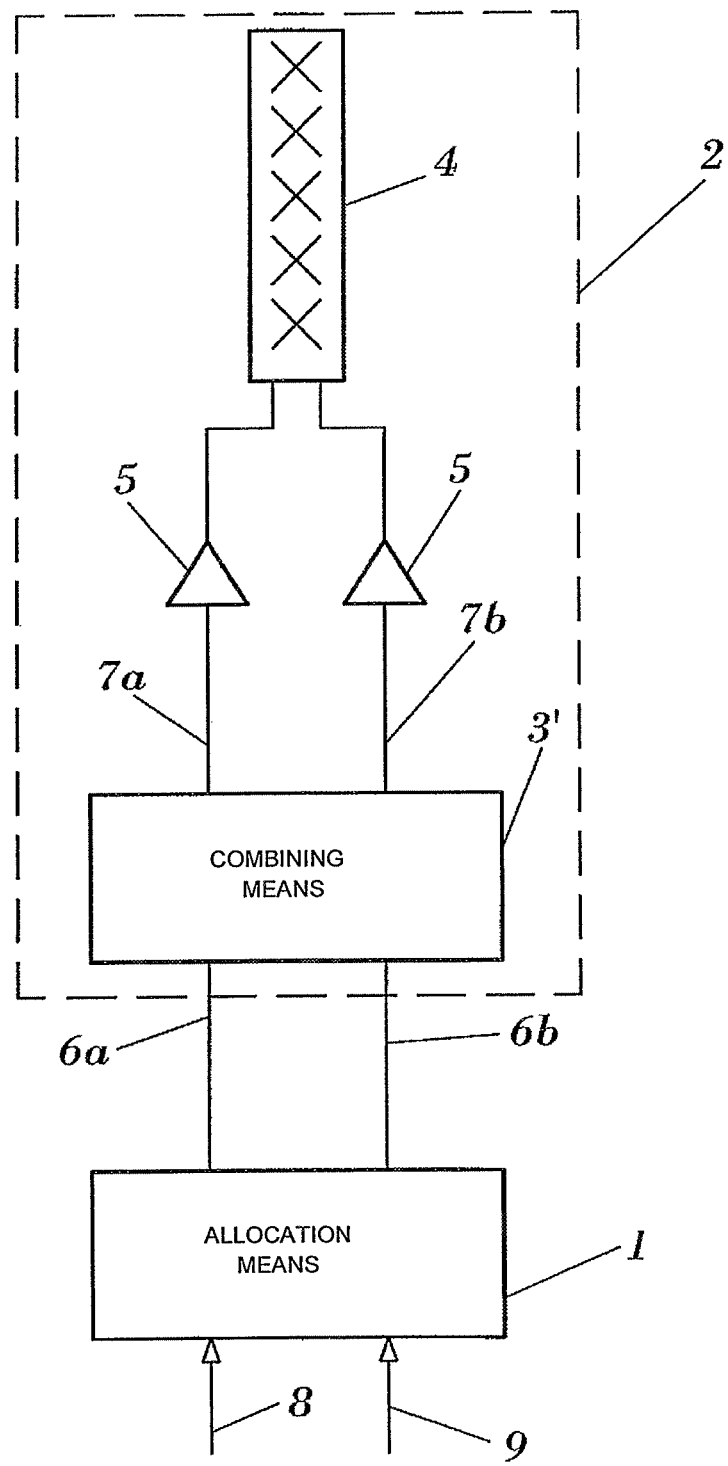
FIG. 2 shows a diagram of a second preferred embodiment of the method of the invention, which uses a specific implementation of the Virtual Antenna Mapping functional block as described in 3GPP Standard to achieve circular polarization.

FIGS. 1 and 2 show two different preferred embodiments of the system of the invention, according to whether the forming of the combined signals 7a, 7b is performed before or after the amplification introduced by means of two Power Amplifiers (PA) 5.

In FIG. 1, the traffic of MIMO UEs 8 and the traffic of non MIMO UEs 9 are allocated in a first signal 6a and a second signal 6b by the allocation means 1. After this allocation, the first signal 6a comprises:

non MIMO traffic (e.g. HSDPA, Rel 99, etc)
First MIMO stream
Primary CPICH while the second signal 6b comprises:

Second MIMO stream
Secondary CPICH

These first signal 6a and second signal 6b, are transmitted with orthogonal circular polarizations by the transmission means 2, which comprise two PAs 5, combining means 3, 3' and a cross polar antenna 4.

In order to circularly polarize the first signal 6a and second signal 6b, they are combined by the combining means 3, 3', thus forming two combined signals (first combined signal 7a and second combined signal 7b). The first combined signal 7a comprises the first signal 6a plus the second signal 6b with a 90° phase shift, while the second combined signal 7b comprises the first signal 6a with a 90° phase shift plus the second signal 6b. It is a key point to make sure that any further elements located between the combining means 3, 3' and the antenna 4, maintain the relative phase between the first combined signal 7a and the second combined signal 7b.

As a result, the first combined signal 7a comprises:
non MIMO traffic
First MIMO stream
Primary CPICH
Second MIMO stream (shifted 90°)
Secondary CPICH (shifted 90°)

and the second combined signal 7b comprises:
non MIMO traffic (shifted 90°)
First MIMO stream (shifted 90°)
Primary CPICH (shifted 90°)
Second MIMO stream
Secondary CPICH By transmitting the first combined signal 7a by means of the cross polar antenna with a first linear polarization, and the second combined signal 7b with a second linear polarization, orthogonal to the first linear polarization, the sum of both transmission results in the first signal 6a and the second signal 6b being transmitted with two orthogonal circular polarizations (i.e. the first signal 6a being transmitted with left hand circular polarization, LHC, and the second signal 6b with right hand circular polarization, RHC, or viceversa, depending on the sign of the shift).

In order to have a deeper understanding on how the circular polarization is produced, hereafter you can find the explanation that justifies the methodology proposed.

Since an Electrical Field ($\vec{E}$) is transmitted over two orthogonal antenna arrays with linear polarizations (i.e. +45°, −45°), it can be expressed as the combination of two orthogonal vectors (Ex and Ey):

$$\vec{E} = (Ex, Ey)$$

wherein
$Ex = Eo \cdot \cos(wt + \Phi)$ (antenna array) +45°
$Ey = Eo \cdot \cos(wt + \Phi)$ (antenna array) −45° wherein Eo is the amplitude of the Electrical Field, w is its frequency, $\Phi$ is the phase of Ex and Ey.

As stated above, the invention proposes to have one of the components 90° shifted, the above formulae resulting as (for the case of shifting Ey):

$Ex = Eo \cdot \cos(wt + \Phi)$ (antenna array +45°)
$Ey = Eo \cdot \cos(wt + pi/2 + \Phi)$ or, in an equivalent manner
$Ey = Eo \cdot sen(wt + \Phi)$ (antenna array −45°)

If the two components are represented in a plane the variation of $\vec{E}$ in the plane xy versus time, which is actually the $\vec{E}$ polarization, represents a circumference. LHC or RHC polarization are obtained depending on the antenna array where the $90^a$ phase shifted is introduced.

Non MIMO traffic, both MIMO streams and the primary and secondary CPICH are thus transmitted through both antennas and with the needed phase shifts in order to produce circular polarization. Therefore, regardless of the introduced phase, a non MIMO terminal sees both signals as suffering the same transformations before being received by the UE. Therefore, the second MIMO signal does not become in a harmful interference because it is transmitted through the same channel and the orthoganality with regards to the other non MIMO signals is kept.

On the other hand, the use of LHC circular polarization and RHC circular polarisation allows a MIMO UE receiving the two MIMO streams through independent channels as they are orthogonal polarisations, decoding each MIMO stream independently.

Two alternative implementations for the combining means 3, 3' are hereby presented:

A 90° hybrid combiner 3 (FIG. 1), which combines the first and second signals after its amplification by the PAs 5. The combination is thus performed at a physical level.

Virtual Antenna Mapping means 3' (FIG. 2), which combines the first and second signal at a logical level, before converting the data into electrical signals and before its amplification by the PAs 5.

The invention claimed is:

1. Method for data transmission in a wide area mobile network which provides at least one radio carrier for allocating traffic of coexisting MIMO User Equipments, and non MIMO User Equipments, wherein the at least one radio carrier carries a first signal and a second signal, and the traffic of MIMO User Equipments comprises a first MIMO data stream associated to a primary pilot channel and a second MIMO data stream associated to a secondary pilot channel, characterised in that the method comprises:
(i) allocating in the first signal the traffic of non MIMO user Equipments, the first MIMO data stream and the primary pilot channel;
(ii) allocating in the second signal the second MIMO data stream and the secondary pilot channel;
(iii) combining the first and second signals into each of a first combined signal and a second combined signal;
(iv) transmitting the first combined signal using a first linear polarization and the second combined signal using a second linear polarization so as to transmit the first signal using a first circular polarization and transmit the second signal using a second circular polarization that is orthogonal to the first circular polarization.

2. Method according to claim 1,
wherein the first combined signal comprises the first signal plus the second signal with the second signal having a phase shift of substantially 90° with respect to the first signal;
wherein the second combined signal comprises the first signal plus the second signal with the first signal having a substantially 90° phase shift with respect to the second signal; and
wherein the second linear polarization is orthogonal to the first linear polarization.

3. System for data transmission in a wide area mobile network which provides at least one radio carrier for allocating traffic of coexisting MIMO User Equipments, and non MIMO User Equipments, wherein the at least one radio carrier carries a first signal and a second signal, and the traffic of MIMO User Equipments comprises a first MIMO data stream associated to a primary pilot channel and a second MIMO data stream associated to a secondary pilot channel, wherein the system comprises:
allocating means configured to allocate in the first signal the traffic of non MIMO user Equipments, the first MIMO data stream, and the primary pilot channel and to allocate in the second signal the second MIMO data stream and the secondary pilot channel; and
transmission means configured to combine the first and second signals into each of a first combined signal and a second combined signal and to transmit the first combined signal using a first linear polarization and second combined signal using a second linear polarization so as to transmit the first signal with a first circular polarization and transmit the second signal with a second circular polarization that is orthogonal to the first circular polarization.

4. System according to claim 3 characterised in that the transmission means comprises:
combining means configured to form:
the first combined signal which comprises the first signal plus the second signal with the second signal having a substantially 90° phase shift with respect to the first signal;
the second combined signal which comprises the first signal plus the second signal with the first signal having a substantially 90° phase shift with respect to the second signal;
a cross-polar antenna configured to transmit the first combined signal with the first linear polarization and the second combined signal with the second linear polarization,
wherein the second linear polarization is orthogonal to the first linear polarization.

5. System according to claim 4 characterised in that the combining means are a 90° hybrid combiner whose inputs are the first signal and the second signal and whose outputs are the first combined signal and the second combined signal, and in that the transmission means comprise two power amplifiers which are configured to amplify the first signal and the second signal.

6. System according to claim 4 characterised in that the combining means are Virtual Antenna Mapping means whose inputs are the first signal and the second signal and whose outputs are the first combined signal and the second combined signal, and in that the transmission means comprise two power amplifiers which are configured to amplify the first combined signal and the second combined signal.

* * * * *